United States Patent [19]

Lebow

[11] 3,988,844

[45] Nov. 2, 1976

[54] LIGHTING SYSTEM FOR COMPATIBLE STEREO VIEWER

[76] Inventor: Marvin E. Lebow, 3431 E. 62nd Place, Tulsa, Okla. 74136

[22] Filed: June 9, 1975

[21] Appl. No.: 585,316

[52] U.S. Cl. .............................. 40/130 B; 40/106.1; 350/143
[51] Int. Cl.² .......................................... G09F 13/10
[58] Field of Search ........... 40/106.1, 130 R, 132 R, 40/152.2, 130 B; 350/138, 141, 143; 240/2 AT

[56] References Cited
UNITED STATES PATENTS

| 802,646 | 10/1905 | Kettles | 40/130 C |
|---|---|---|---|
| 3,270,451 | 9/1966 | Bartleson et al. | 40/130 R |
| 3,324,290 | 6/1967 | Lasker | 40/130 R X |
| 3,888,564 | 6/1975 | Lebow | 40/106.1 |

FOREIGN PATENTS OR APPLICATIONS

| 778,623 | 12/1934 | France | 40/130 R |

*Primary Examiner*—John F. Pitrelli
*Attorney, Agent, or Firm*—Head, Johnson & Chafin

[57] ABSTRACT

An internal or self-contained lighting system for a viewer utilized in a viewing system which permits the stereoscopic viewing of a photograph, or the like, said photograph also being adapted for two dimensional viewing or display when not being viewed in three dimensions, said lighting system including light bulb means mounted within the viewer housing, reflector means arranged within said housing for cooperation with the bulb means for directing the light emanating therefrom onto the back-to-back images of the picture being viewed, and dispersing the light across the faces of the picture for efficiently illuminating the image during viewing thereof.

5 Claims, 1 Drawing Figure

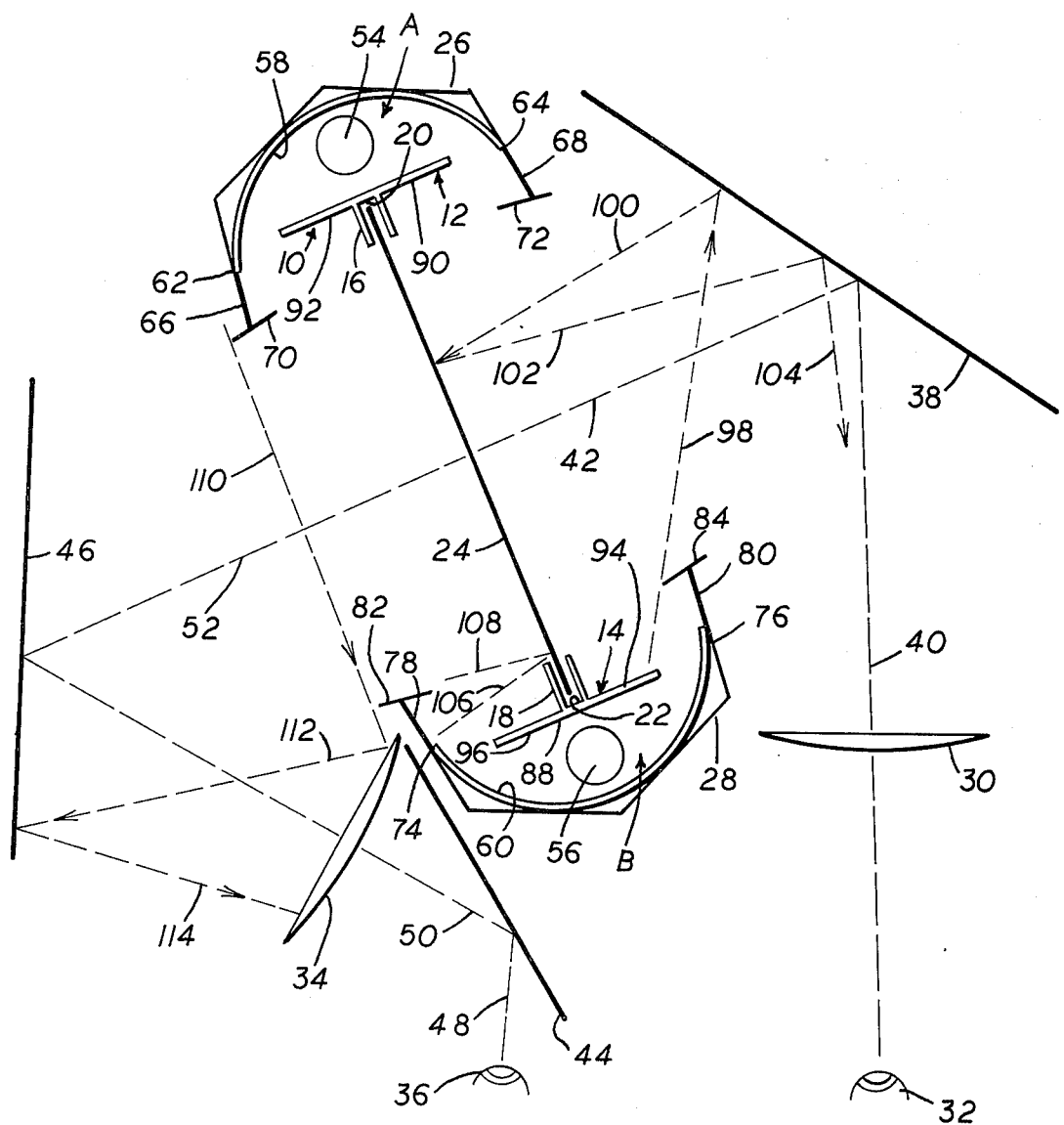

LIGHTING SYSTEM FOR COMPATIBLE STEREO VIEWER

BACKGROUND OF THE INVENTION

1. Field of the Invention

This invention relates to improvements in lighting systems and more particularly, but not by way of limitation, to a lighting system particularly designed and constructed for illuminating the opposite faces of a picture being viewed in a three dimensional viewing system.

2. Description of the Prior Art

There have been many three dimensional viewers of the stereoscopic type wherein a pair of matched left and right eye images or pictures may be viewed simultaneously to simulate three dimensions. These three dimensional viewing devices normally utilize a pair of pictures arranged side-by-side in a common carrier member, and the lighting thereof is a relatively simple matter during a viewing procedure. However, as shown in my co-pending application Ser. No. 405,392, filed Oct. 11, 1973, now U.S. Pat. No. 3,888,564, and entitled "Viewing System Providing Compatability Between Two Dimensional Pictures and Three Dimensional Viewing Thereof" a stereographic type viewing system is disclosed wherein a single picture having a pair of right eye and left eye images mounted back-to-back may be viewed in the viewer apparatus in three dimensions, but may be equally satisfactorily viewed in the usual two dimensional display. The interior lighting of the viewer of this two dimensional-three dimensional compatibility system becomes somewhat more difficult in that it is important to disperse the light substantially equally across the entire surface of the front as well as the back of the picture disposed within the viewer during the three dimensional viewing process.

SUMMARY OF THE INVENTION

The present invention contemplates a novel lighting system for a viewer of the three dimensional-two dimensional viewing system as shown in my aforesaid application. The novel viewing system comprises a pair of suitable light bulbs mounted within the viewer housing at opposite ends of the picture receiving means in order to provide internal lighting for the viewer. Reflector means is disposed within the housing and arranged with respect to each bulb in a manner for reflecting or directing the light rays emanating therefrom simultaneously onto each face of the picture disposed within the picture receiving means. In addition, certain internal portions of the viewer are provided with mask means which eliminate reflection of the light rays onto unwanted portions of the interior of the viewer housing, and curtains or walls are arranged internally of the housing for screening portions of the interior thereof from the light rays in order to achieve a substantially uniform lighting across each face of the picture and eliminating distracting reflections from light "bouncing" from the internal structures of the viewer housing. The novel lighting system is simple and efficient in operation and economical and durable in construction.

BRIEF DESCRIPTION OF THE DRAWINGS

The single FIGURE is a schematic view of an internal lighting system embodying the invention as utilized in combination with a three dimensional-two dimensional viewing system such as disclosed in my prior co-pending application.

DESCRIPTION OF THE PREFERRED EMBODIMENT

Referring to the drawings in detail, structural portions of a suitable three dimensional viewer are schematic wherein reference character 10 generally indicates a suitable picture receiving means comprising a pair of spaced upstanding walls 12 and 14 having inwardly directed flange members 16 and 18, respectively, forming a pair of oppositely directed grooves or recesses 20 and 22 for slidably receiving the opposite side edges of a suitable picture 24 therein. As particularly set forth in my aforementioned application, the picture 24 is of the type having a pair of images mounted in aligned back-to-back relation, with one of said images being a right eye image and the other of said images being a left eye image. Each wall 12 and 14 is preferably substantially surrounding on at least three sides thereof by structural walls 26 and 28 which form a portion of the complete outside walls (not shown) of the viewer whereby a substantially lightproof structure is provided for the viewer. In addition, a first lens 30 is provided within the viewer for sighting through by the right eye 32 of the person utilizing the apparatus, and a second lens 34 is provided for sighting through by the left eye 36 of the person using the apparatus. A first mirror or reflector 38 is disposed within the interior of the viewer apparatus for reflecting the line of sight from the eye 32 to one side of the picture 24 as indicated by the broken lines 40 and 42. A second mirror or reflecting surface 44 is provided within the viewer apparatus for reflecting the line of sight from the left eye 36 through the lens 34 onto a third mirror or reflecting surface 46 as indicated by the broken lines 48 and 50. The mirror 46 then reflects the line of sight of the eye 36 onto the opposite face of the picture 24 as indicated by the broken line 52. Of course, the lenses 30 and 34 and mirrors 38, 44 and 46 are all mounted within the confines of the outer walls (not shown) of the viewer apparatus, and as hereinbefore set forth, it is preferable that the construction of the viewer apparatus be substantially light-proof in order that the internal lighting system as hereinafter set forth may be utilized efficiently for producing the most desirable and effective lighting for the viewing of the picture 24.

The lighting system comprises a first lighting means 54 mounted within the housing (not shown) of the viewer apparatus in the proximity of the upstanding wall 12, but preferably outboard thereof as shown in the drawing. A second lighting means 56 is similarly mounted within the housing of the viewer apparatus in the proximity of the upstanding wall 14, but outboard thereof. The lighting means 54 and 56 are preferably in the form of a light bulb of relatively small physical size, but having a sufficiently great lighting power as to provide sufficient lighting during the viewing of the picture 24 as will be hereinafter set forth. The bulbs may be of any suitable size and voltage, but it is deemed preferable that they be of the miniature type, and of a low voltage. Of course, any suitable power source (not shown) may be utilized for illumination of the bulbs, such as direct current, alternating current, battery means, or the like, with said power source being operably connected with the bulbs in the usual or well-known manner for actuation thereof.

It appears to be essential that the light path of the light emanating from the lighting means 54 and 56 be directed in such a manner that the opposite faces of the picture 24 are substantially equally "flooded" or "washed" with light across the entire picture areas thereof, while at the same time reflections of light from other portions of the interior surfaces of the housing of the viewer should be eliminated. Accordingly, an arcuate reflecting wall 58 is disposed against the inwardly directed portions of the housing wall 26 in order to reflect the rays from the bulb 54 simultaneously onto the opposite faces of the picture 24. The reflector wall 58 preferably extends throughout the length or depth of the viewer housing and casts the light from the bulb 54 over substantially one-half the entire area of the picture 24. Similarly, an arcuate reflector wall 60 is disposed against the inwardly directed sides of the wall 28 for reflecting the light rays from the bulb 26 simultaneously onto the opposite faces of the picture 24 for illuminating substantially the remaining half of the entire area of the picture 24, thus producing light on the entire area of both faces of the picture 24. The reflector wall 58 terminates at a point slightly beyond the edges of the wall 12, as shown at 62 and 64, and a matt or curtain 66 and 68 extends therebeyond for adsorbing the light coming from the bulb 54. It may be preferable that the length of the wall 12 on one side of the flange 16 be approximately one-quarter the width of the picture 24, and the spacing between the end of the wall 12 and the reflector surface 58 be approximately one third the length of the portion of the wall 12 projecting from the flange 16. However, this dimension is not critical. In addition, a curtain or wall 70 terminates the curtain 66 and a similar wall 72 terminates the curtain 68, with the walls 70 blocking the travel of light rays from the bulb 54 in a manner and for a purpose as will be hereinafter set forth.

Similarly, the side edges of the reflector wall 60 terminate at a point slightly beyond the wall 14 as shown at 74 and 76, and matts or curtains 78 and 80 are provided at the terminus of the reflector wall 60 for absorbing light rays from the bulb 56. Also, curtains or walls 82 and 84 interrupt the curtains 78 and 80, respectively, and preclude or block the passage of light from the bulb 56 as will be hereinafter set forth.

In addition to the arcuate reflector walls 58 and 60, it is preferable to provide a reflecting surface on the outer wall of face 86 of the wall 12 and a similar reflecting surface on the outer wall or face 88 of the wall 14. The reflecting surfaces 86 and 88 cooperate with the reflector walls 58 and 60 for projecting and diffusing the available light from the bulbs 54 and 56 onto the opposite faces or opposite planes of the picture 24. A light reflective material is desirable, although the surfaces may be of a matte finish in whole or in part to aid in diffusing the light if necessary. The light distribution is preferably as even as possible across the faces or planes of the picture 24, and the curved or arcuate configuration of the reflector walls 58 and 60 appears to aid in focusing the light for the purpose. It is to be understood, however, that the reflector walls 58 and 60 may be of any desired configuration and are not limited to the particular arcuate configuration shown herein.

It is also preferable that the inwardly directed faces 90 and 92 of the wall 12 and the inwardly directed faces 94 and 96 of the wall 14 be constructed of or covered with a light absorbing material so as to mask the light flow from the bulbs 54 and 56. The mask 94 and 84 preclude the passage or flow of light from the bulb 56 to the eye 32. This particular path is indicated by the broken lines 98, 100, 102 and 104, and it will be apparent that the curtain or wall 84 interrupts this flow of light. The wall 12 is provided with similar masking for purposes of symmetry only, as this particular reflection is not present or does not originate from the light source 54. The masks 78 and 80 absorb any light that might be reflected from the edge of the picture 24, as indicated by the broken lines 106 and 108. It is also preferable to minimize unwanted reflections from the surface of the lenses 30 and 34 when such reflections might interfere with satisfactory viewing of the picture 24. Such a light path is illustrated by the broken lines 110, 112 and 114. This particular path results from one particular selection of lens surface shape and it is to be understood that other paths would occur when lenses of differing contours are used. Different lens radii would produce different overall geometry of the viewing system employed and similar masking may be utilized or provided as required for precluding the unwanted reflections. The outer surfaces of the mask 64, 66, 78 and 80 block any stray light which might inadvertently enter the interior of the viewer housing due to any leakage of light.

The areas designed A and B may be referred to as light boxes, and each light box is particularly designed to maximize the amount of available light reaching the picture planes and at the same time to minimize the unwanted surface reflections that might be seen on the glossy surfaces of the picture 24. Whereas some particular reflections and their manner of elimination is hereinbefore set forth it is to be understood that the same type arrangement may be adapted for eliminating substantially any unwanted reflections. In the design of the lighting system of the invention, the light boxes A and B may be placed in substantially any suitable position within the viewer housing wherein sufficient room or space is available for the component parts of the lighting system and which provides a satisfactory lighting of both sides of the picture 24. A symmetric geometry with respect to the picture planes or the end points of the picture as illustrated herein is preferable, however.

From the foregoing it will be apparent that the present invention provides a novel lighting system particularly designed and constructed for a viewer utilized in the stereographic viewing of a picture comprising a pair of back to back images. The lighting system comprises a pair of light boxes arranged with respect to the picture for simultaneously flooding the opposite sides of the picture with substantially evenly distributed flow of light across the entire surface areas thereof. In addition, masks are provided for interrupting the flow of unwanted reflections and for precluding the application of leakage light against the surfaces of the picture. The overall or end result of the novel lighting system is much the same as the lighting of a stage in a theater wherein the area to be observed is well and evenly lighted and those areas not to be seen are darkened, with disturbing side lighting being substantially eliminated.

Whereas the present invention has been described in particular relation to the drawings attached hereto, it should be understood that other and further modifications apart from those shown or suggested herein may be made within the spirit and scope of this invention.

What is claimed:

1. A lighting system for illuminating a picture in a three dimensional viewer apparatus and comprising light box means provided in the interior of said viewer apparatus for directing light simultaneously to the opposite faces of said picture, illuminating means provided for said light box means for supplying said light substantially uniformly across said opposite faces of said picture, reflecting means provided for said light box means and cooperating with said illuminating means for directing the light simultaneously to the opposite faces of said picture, means precluding entry of ambient light from the exterior of the viewer into the area surrounding the picture, and masking means provided for said light box means for blocking the path of unwanted light from said illuminating means to preclude hampering of the lighting of the picture.

2. A lighting system as set forth in claim 1 wherein said light box means comprises a pair of light boxes arranged symmetrically with respect to the picture.

3. A lighting system as set forth in claim 1 wherein the illuminating means comprises light bulb means arranged for cooperation with the reflecting means for directing a supply of light across substantially the entire surface of the opposite sides of said picture.

4. A lighting system for illuminating a picture in a three dimensional viewer apparatus and comprising first light box means disposed in the proximity of one side edge of the picture, second light box means substantially identical with said first light box means and disposed in the proximity of the opposite side edge of the picture, each of said light box means including at least one light bulb, reflector means surrounding a portion of said light bulb for directing the light simultaneously across substantially half the surface of each face of the picture whereby the entire surface of each face of said picture is substantially equally lighted, means precluding entry of ambient light from the exterior of the viewer into the area surrounding the picture, and mask means selectively arranged with respect to said light bulb and said reflecting means for interrupting reflected light and other unwanted light paths for reducing application of unwanted light on the picture during a viewing operation.

5. A lighting system as set forth in claim 4 wherein the reflecting means comprises arcuate wall means surrounding a portion of said light bulb for selectively directing the light onto the opposite sides of the picture, and auxiliary reflecting means oppositely disposed with respect to the arcuate reflecting means for cooperation therewith for diffusion of said light.

* * * * *